United States Patent [19]
Shaw

[11] 3,767,555
[45] Oct. 23, 1973

[54] REPLACEABLE TOOL FOR ELECTROCHEMICAL DRILLING

[75] Inventor: Richard H. Shaw, Hampden, Mass.

[73] Assignee: United Aircraft Corporation, East Hartford, Conn.

[22] Filed: Oct. 18, 1971

[21] Appl. No.: 189,862

[52] U.S. Cl. ......... 204/224 M, 204/284, 204/297 R
[51] Int. Cl. ............................. B23p 1/02, B01k 3/04
[58] Field of Search ................... 204/224, 225, 284, 204/297 R, 291

[56] References Cited
UNITED STATES PATENTS
3,719,579  3/1973  Cross et al. ................. 204/297 R X
3,668,105  6/1972  Abt .............................. 204/297 R
3,314,875  4/1967  Andrews ............................ 204/224
3,421,997  1/1969  Williams ............................ 204/284

Primary Examiner—John H. Mack
Assistant Examiner—D. R. Valentine
Attorney—Charles A. Warren

[57] ABSTRACT

A replaceable tool for an electrochemical drilling operation in which several electrodes are supported by a base that is mounted as a unit on a tool support and has arrangements for connecting to the electrical supply and to the supply of electrolyte.

7 Claims, 4 Drawing Figures

INVENTOR
RICHARD H. SHAW
BY Charles A Warren
ATTORNEY

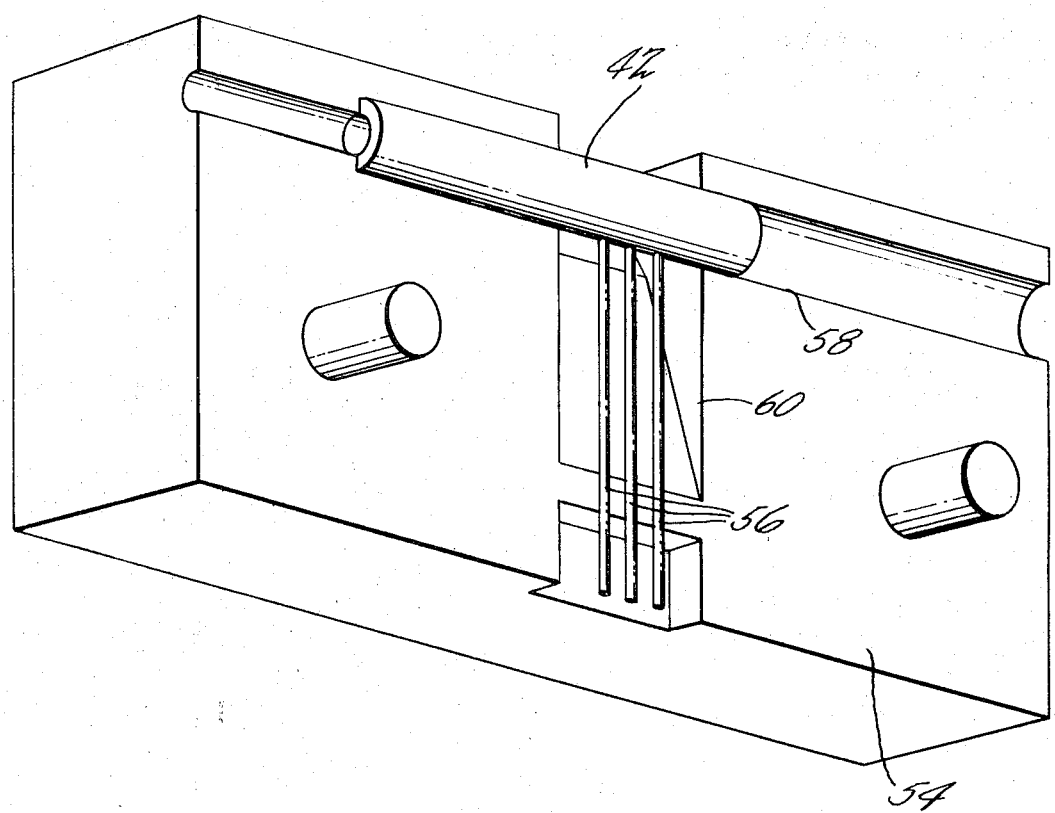
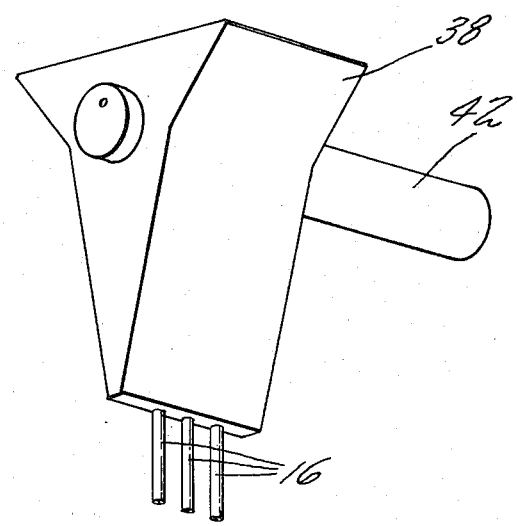

REPLACEABLE TOOL FOR ELECTROCHEMICAL DRILLING

BACKGROUND OF THE INVENTION

In multiple electrode drilling, long individually mounted tubular electrodes are held in an electrically conductive manifold and supported near the work by suitable guides. The connections at the manifold and in the guides are difficult to make secure without leakage and without damage to the electrode. Further, replacement of a damaged electrode requires excessive "down time" for the machine.

SUMMARY OF THE INVENTION

One feature of this invention is an electrode assembly which serves to support a plurality of electrodes in predetermined relation to one another and which is positioned as a unit within the electrochemical drilling machine. Another feature is the arrangement of the support for the assemblage of electrodes such that connection is made with the electrical supply and with the supply of electrolyte when the support is positioned on the machine.

According to the invention, a base of suitable dielectric material shaped to fit removably in a recess in the electro-chemical machine supports at least one electrode therein and preferably a plurality of electrodes in predetermined relation to one another with the base providing a connection when positioned in the machine from the electrolyte supply to the electrodes and an electrical connection from the source of electricity to the electrodes.

BRIEF DESCRIPTION OF THE DRAWINGS

FIG. 3 is a perspective view of the device.

FIG. 4 is a perspective view of a mold element used in making the tool.

DESCRIPTION OF THE PREFERRED EMBODIMENT

Figure 1:
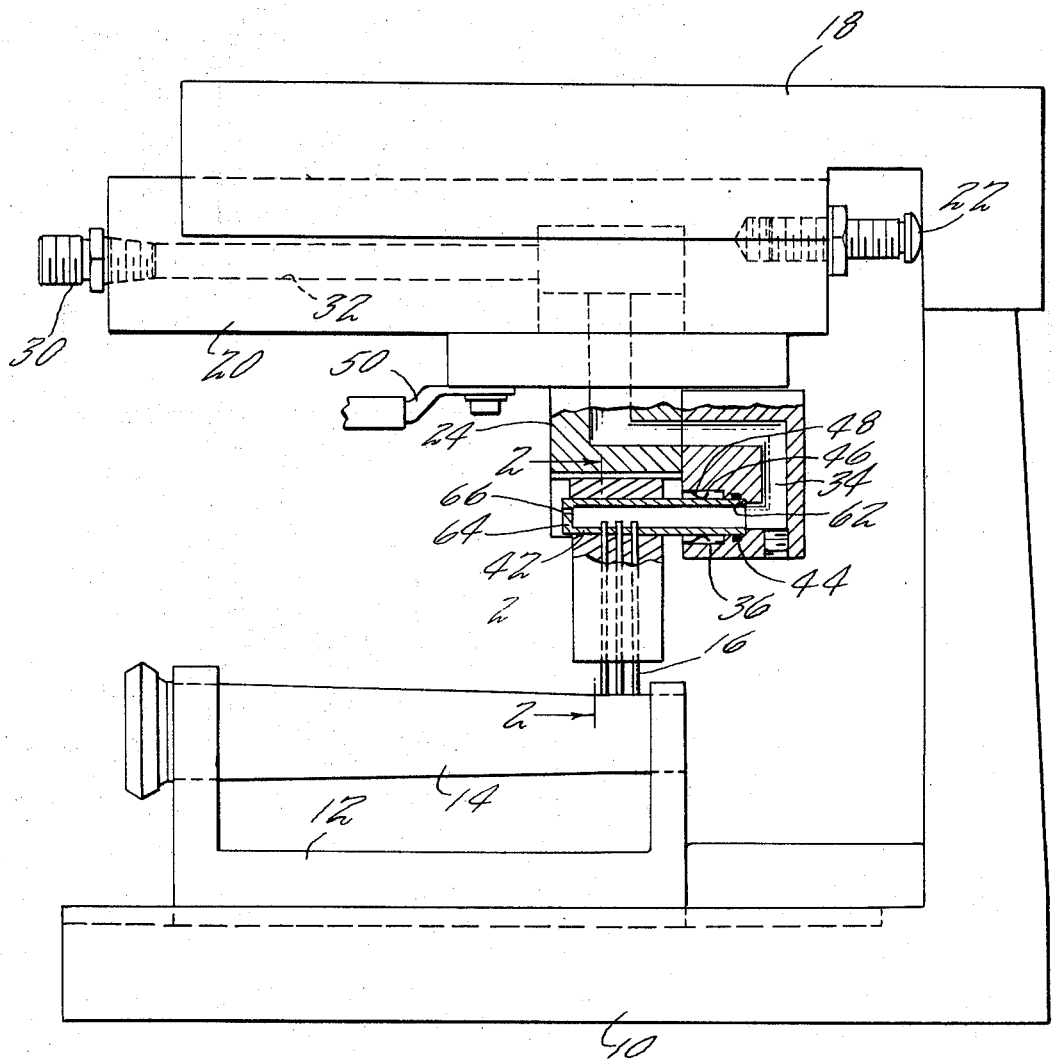
FIG. 1 is a sectional view through a part of a machine showing the device in position therein.

The machine shown in FIG. 1 has a base 10 on which a work support 12 is mounted for supporting a workpiece 14 therein. The work support is adapted for positioning on the base for movement in a horizontal plane so that the workpiece may be properly positioned below the electrodes 16 which serve to drill the desired holes in the workpiece.

Positioned above the work support and also carried by the base is a tool support structure which includes a support 18 on which a slide 20 is mounted for horizontal movement. The slide may incorporate stop means 22 for accurately positioning the slide in predetermined relation to the workpiece mounted below. The slide carries a bracket 24 which has a dovetail slot 26, FIG. 2, therein to receive the replaceable tool 28, FIG. 2. The slide 20 has a connection 30 for attachment to a supply of electrolyte and this electrolyte is directed through a passage 32 in the slide and a cooperating passage 34 in the bracket 24. The passage 34 terminates in a cylindrical recess 36 positioned horizontally in the bracket and this recess 36 receives a portion of the replaceable tool as will be apparent.

Figure 2:
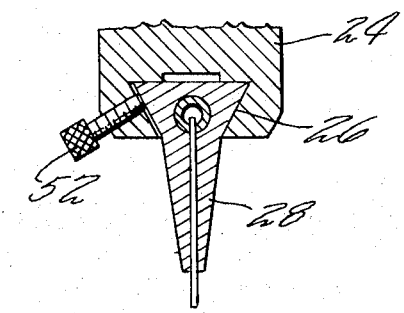
FIG. 2 is an end view of a portion of the machine of FIG. 1.

The replaceable tool as shown in FIGS. 2 and 3 includes a base 38 in which are embedded the plurality of electrodes 16 except for the operative ends of these electrodes and except for a tube 42 with which the hollow electrode communicate. The tube 42 extends beyond the base 38 and is received in the recess 36 as shown in FIG. 1. A suitable seal 44 provides a fluid-tight connection for the tube 42 within the recess 36. In alignment with the recess 36 is a slightly larger recess 46 and this recess has an electrical spring connection 48 therein to engage with the surface of the tube 42 when it is in the operative position shown in FIG. 1 thereby making an electrical connection through the bracket 24 from the electrical supply 50 to the tube 42 and thence to the electrodes 16.

As shown in FIG. 2, when the tool 28 is in position in the machine, it is held in this position as, for example, by a clamping screw 52 located in the bracket 24. The dovetail slot in the bracket locates the replaceable tool in precise relation to the workpiece, the latter being located beneath the tips of the electrodes forming part of the replaceable tool.

In making the replaceable tool, the tube 42 has the necessary number of holes drilled therein to accept the several electrodes 16 and, when the electrodes are inserted into the tube through the formed holes, these electrodes are secured in the tube by a suitable conductive sealer which in addition to supporting the electrodes securely in position in the tube also serves to provide a good electrical contact between the tube and the electrodes. It is desired to have the ends of electrodes project through the wall of the tube and slightly into the central passage in the tube as shown in FIG. 1. If the electrodes have a dielectric coating on the outer surface, this coating is removed in the area of the tube 42 to assure a good electrical contact.

After the tube and electrodes are assembled, they are supported in a mold part 54, FIG. 4. A similar mating part, not shown, cooperates with this part in forming the complete mold. This mold part has guide passages 56 located adjacent to the operative tips of the electrodes to support them in precise relation to one another and also has a transverse guide passage 58 to receive the tube 42. The mold part 54 has a recess 60, and when the mating mold parts are assembled, the cooperating recesses form a cavity into which the material forming the base 38 is poured to form an enclosure for a part of the tube and for the portion of electrodes between the tube and the operative tips. The material for the base is preferably a low exotherm room-temperature-curing vacuum-degassed, epoxy resin. This resin solidifies to form a base of the appropriate shape with the dovetail configuration adjacent the tube 42 to fit within the machine as above described, and to make sure of the proper location of the tube in the recess 36.

By using a mold of the type shown and thereby precisely locating the open end of the tube 42 within the surrounding base, it will be apparent that when this replaceable tool is positioned in the machine as shown in FIG. 2, this open end of the tube will engage a shoulder 62 at the end of the recess 36 so that the electrodes 16 will be located and supported in the precise position for drilling the desired holes in the workpiece. The outer end of the tube 42 is closed by a cap 64 which has a small opening 66 therein to provide a continuous air bleed so that there is a continuous gas-free supply of electrolyte to the electrodes when the device is in operation.

Should the tip of one of the electrodes 16 be damaged in any way, the damaged tool with the damaged electrode thereon is readily withdrawn from the machine and a new undamaged tool as readily placed in position so that the machine can continue in operation with no significant loss of time. The replacement of the tool necessitates only the release of the holding screw 52 to permit the damaged tool to be slid out of the dovetail slot and a new one positioned therein. The positioning of the new tool also makes the desired electrical and electrolyte connections so that the machine may be immediately put back in use.

The base for the tool is so contoured adjacent the operative ends of the electrodes as to permit the operator of the machine to see readily the progress of the drilling operation and at the same time provide a suitable support for the several electrodes.

I claim:

1. A replaceable tool for an electrochemical drilling machine having a tool receiving recess with guiding surfaces therein, and an electrolyte supplying passage parallel to said guiding surfaces, said tool including:
   a base of dielectric material shaped to fit removably in said recess and having guiding surfaces cooperating with the guiding surfaces on the machine,
   a tube in said base and having a projecting end to receive electrolyte, said tube extending from said base in parallel relation to said surfaces and positioned to engage said passages,
   at least one electrode in said base substantially at right angles to the tube and having one end intersecting said tube within the base,
   the operative end of the electrode projecting from said base and being supported thereby in operative position for a drilling operation.

2. A replaceable tool as in claim 1 in which
   a plurality of electrodes are positioned in and supported by said base in parallel relation to one another and all intersecting said tube for drilling a plurality of holes simultaneously.

3. An electrochemical drilling machine having
   a work support,
   a tool support in predetermined relation to said work-piece support and movable relative to said workpiece support for performing a drilling operation,
   tool mounting guide means on said tool support, and
   electrolyte supply means in parallel relation to the guide means on said tool support, in combination with,
   a tool having a dielectric base with cooperating guide means to engage releasably with said tool mounting guide means,
   a plurality of electrodes within and supported by said base and having projecting tips in a position to perform a drilling operation on a workpiece on said work support, and
   an electrolyte tube in said base intersecting with said electrodes to supply them with electrolyte, said tube being supported by said base in parallel relation with said cooperating guide means in a position to engage said electrolyte supply means when said base is positioned on said tool mounting means.

4. A machine as in claim 3 in which the tool support has electrical contact means in a position to engage the tube when the base is positioned on the tool mounting means.

5. A machine as in claim 3 in which the tube extends beyond the base, and the electrical contact means engage with said tube extension when the base is positioned on said tool mounting means.

6. A replaceable tool for use on an electrochemical drilling machine having tool guide means thereon and an electrolyte supply passage having its axis parallel to and in fixed relation to the guide means, said tool including
   a dielectric base having guide means to cooperate with said tool guide means on the machine,
   a tube in said base in parallel relation to the guide means thereon and having a projecting open end in such fixed relation to the guide means on the base as to enter said electrolyte supply passage when the tool is positioned on the machine, and
   a plurality of parallel hollow electrodes within the base having their operative ends projecting therefrom and all intersecting with said tube to receive electrolyte therefrom.

7. A tool as in claim 6 in which the base is nonconductive, the tube and electrodes are conductive, and the projecting end of the tube engages an electrical contact on the machine adjacent to the electrolyte supply passage.

* * * * *